US009384073B2

(12) United States Patent
Mazzoni et al.

(10) Patent No.: US 9,384,073 B2
(45) Date of Patent: Jul. 5, 2016

(54) CROSS-EXTENSION MESSAGING USING A BROWSER AS AN INTERMEDIARY

(75) Inventors: Dominic Mazzoni, Fremont, CA (US); Erik Kay, Belmont, CA (US)

(73) Assignee: Google Inc., Mountain View, CA (US)

(*) Notice: Subject to any disclaimer, the term of this patent is extended or adjusted under 35 U.S.C. 154(b) by 227 days.

(21) Appl. No.: 13/409,651

(22) Filed: Mar. 1, 2012

(65) Prior Publication Data

US 2013/0232506 A1 Sep. 5, 2013

(51) Int. Cl.
*G06F 9/54* (2006.01)

(52) U.S. Cl.
CPC ............... *G06F 9/547* (2013.01); *G06F 9/542* (2013.01); *G06F 2209/543* (2013.01)

(58) Field of Classification Search
None
See application file for complete search history.

(56) References Cited

U.S. PATENT DOCUMENTS

| | | | | |
|---|---|---|---|---|
| 6,134,680 | A * | 10/2000 | Yeomans | 714/57 |
| 7,693,719 | B2 * | 4/2010 | Chu et al. | 704/270.1 |
| 7,788,100 | B2 * | 8/2010 | Slotznick et al. | 704/270.1 |
| 8,255,824 | B2 * | 8/2012 | Selig | 715/781 |
| 8,448,241 | B1 * | 5/2013 | Kadakia | 726/22 |
| 8,527,881 | B2 * | 9/2013 | Selig | 715/738 |
| 2002/0046109 | A1 * | 4/2002 | Leonard et al. | 705/14 |
| 2005/0038788 | A1 * | 2/2005 | Dettinger et al. | 707/10 |
| 2006/0161426 | A1 * | 7/2006 | Ikegami | 704/201 |
| 2007/0042332 | A1 * | 2/2007 | Leem | 434/156 |
| 2008/0184157 | A1 * | 7/2008 | Selig | 715/781 |
| 2009/0288098 | A1 * | 11/2009 | Abd-El-Malek et al. | 719/312 |
| 2010/0205618 | A1 * | 8/2010 | Gonzalez et al. | 719/328 |
| 2010/0299588 | A1 * | 11/2010 | Dattilo et al. | 715/234 |
| 2011/0154212 | A1 * | 6/2011 | Gharpure et al. | 715/738 |
| 2011/0314389 | A1 * | 12/2011 | Meredith et al. | 715/751 |

FOREIGN PATENT DOCUMENTS

WO 2013130862 A1 9/2013

OTHER PUBLICATIONS

Search Report and Written Opinion for International Application No. PCT/US2013/028394, mailed Jun. 7, 2013, 10 pages.

* cited by examiner

*Primary Examiner* — Brian W Wathen
*Assistant Examiner* — Abdou Seye
(74) *Attorney, Agent, or Firm* — Brake Hughes Bellermann LLP

(57) ABSTRACT

A method for mediating messages between at least two browser extensions using a web browser of a computing device includes receiving a request from a first browser extension via a messaging application programming interface provided by the web browser, wherein a receiver of the request is a second browser extension determined by the messaging application programming interface based on a requested functionality included in the request from the first browser extension. The method includes sending, using the messaging application programming interface, the request to the second browser extension when the requested functionality is available in the second browser extension, and sending an error message to the first browser extension using the messaging application programming interface when the requested functionality is not available.

20 Claims, 6 Drawing Sheets

CROSS-EXTENSION MESSAGING USING A BROWSER AS AN INTERMEDIARY

TECHNICAL FIELD

This application generally relates to web browser technology.

BACKGROUND

Use of the World Wide Web continues to increase, as does the amount and variety of content that is available to its users. Users of the World Wide Web commonly use browsers (web browsers) implemented on a web-enabled computing device to access content. Such devices include personal computers, laptop computers, netbook computers, smartphones and cell phones, among a number of other possible devices. Such web browsers are configured to read programmatic code and render that code as web pages, which may include rendering both audio and visual content contained in various media files (e.g., image, video and audio files), as well as performing other functions defined in the programmatic code. Web pages are generally implemented using programming languages such as HTML (including HTML5), CSS and JavaScript, among a number of other available programming languages.

Some browsers allow users to install add-ons (or extensions) to the browser, where such extensions add functionality to the browser and operate as an integrated part of the browser. For instance, an extension may provide a user access to its additional functionality by modifying a user-interface (UI) of the browser. As an example, a weather forecast extension may be added to a browser, where the extension provides easy access to weather information by adding an icon or a button to the UI of the browser. A user may then interact with the extension's button or icon (e.g., by clicking it or hovering over it with a pointing device) to obtain weather information, rather than having to browse to a weather related web page in order to obtain weather information.

Browser extensions are generally implemented using programmatic code that is written using the same programming languages that are used for implementing web pages, such as JavaScript. From a browser's perspective, extensions effectively function as web pages that are an integrated part of the browser once they are installed. By installing extensions that are of interest to him or her, a user can effectively create a custom browser that includes the functionality of the extensions they choose to install. For example, a user may utilize extensions to play synthesized text-to-speech, for example when reading a book via a web browser. It may be useful for extensions to exchange messages, while maintaining a user's privacy and while allowing a web browser to cleanly handle errors.

SUMMARY

According to one general aspect, a method for mediating messages between at least two browser extensions using a web browser of a computing device includes receiving a request from a first browser extension via a messaging application programming interface provided by the web browser, wherein a receiver of the request is a second browser extension determined by the messaging application programming interface based on a requested functionality included in the request from the first browser extension. The method includes sending, using the messaging application programming interface, the request to the second browser extension when the requested functionality is available in the second browser extension, and sending an error message to the first browser extension using the messaging application programming interface when the requested functionality is not available.

According to another general aspect, a non-transitory computer readable storage medium hays recorded and stored thereon instructions that, when executed by a computing device, cause the computing device to receive a request from a first browser extension via a messaging application programming interface provided by a web browser of the computing device, wherein a receiver of the request is a second browser extension determined by the messaging application programming interface based on a requested functionality included in the request from the first browser extension; send, using the messaging application programming interface, the request to the second browser extension when the requested functionality is available in the second browser extension; and send an error message to the first browser extension using the messaging application programming interface when the requested functionality is not available.

According to yet another general aspect, an apparatus includes a memory and a processor operably coupled to the memory. The processor may be configured to execute code to receive a request from a first browser extension via a messaging application programming interface provided by a web browser of the computing device, wherein a receiver of the request is a second browser extension determined by the messaging application programming interface based on a requested functionality included in the request from the first browser extension; send, using the messaging application programming interface, the request to the second browser extension when the requested functionality is available in the second browser extension; and send an error message to the first browser extension using the messaging application programming interface when the requested functionality is not available.

The details of one or more implementations are set forth in the accompanying drawings and the description below. Other features will be apparent from the description and drawings, and from the claims.

A system and/or method for message passing between browser extensions using the browser as an intermediary, substantially as shown in and/or described in connection with at least one of the figures, as set forth more completely in the claims.

DETAILED DESCRIPTION

Figure 1:
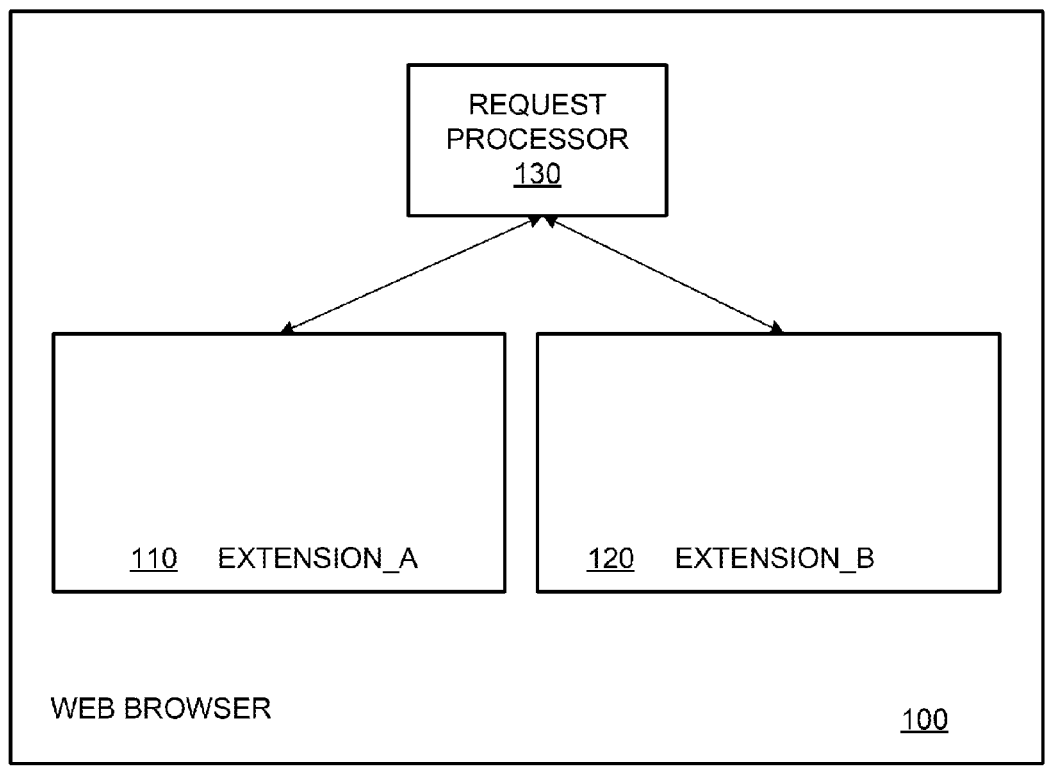
FIG. 1 is a block diagram illustrating an exemplary web browser that implements extension messaging using the browser as an intermediary.

A web browser executed by a client device can receive code (e.g., HTML code) from a remote server (e.g., a remote server that hosts a website) and can execute the receive code on the client device for the benefit of a user of the client device.

In various implementations, the web browser may include or be associated with one or more web applications. In this context, a "web application" may be configured to perform a single task or multiple tasks for a user. In such an implementation, the web application may be configured to be executed or interpreted by the web browser. This is compared with the native applications that include machine executable code and are configured to be executed directly by a processor or via the operating system of the client device, whereas, a web application may be incapable of execution or display without the aid of the web browser. Thus, web applications can be run inside a browser with a dedicated user interface, and may provide functionality and an experience that is more rich and interactive than a standalone website but are less cumbersome and monolithic than a desktop application. Examples of web applications include games, photo editors, and video players that are run inside the browser.

Web applications can be "hosted web applications", "installable web applications," or "packaged web applications." Hosted web applications may include at least a portion of a web site that itself includes web pages, plus some metadata that may be especially pertinent to the web application or to the user of the web application to allow the web application to perform some particular functionality for the user.

Installable web applications are a way of making a browser treat certain websites like applications. Many installable web applications are hosted web applications with extra metadata (such as a small manifest file that describes the application). Packaged web applications are a type of installable web applications. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using extension application programming interfaces (APIs), allowing packaged apps to change the way the browser behaves or looks.

In various examples, the web browser may include or be configured to interact with one or more browser extensions. In this context, a "browser extension" may include one or more web pages packaged or grouped together as a definable whole, and configured to extend the functionality to the web browser. As described herein, "browser extensions" are small software programs that can modify and enhance the functionality of a web browser. They may be written using web technologies such as HTML, JavaScript, and CSS. Extensions may have little or no user interface. Extensions may provide a user interface icon or other user interface that may modify a browser's "chrome", which is defined herein to include an area outside of a webpage displayed in the browser (such as the borders of a web browser window, which include the window frames, menus, toolbars and scroll bars).

Thus, browser extensions also provide extra functionality to a browser, but generally, unlike web applications, there is little or no user interface component to the functionality provided by an extension. Instead, browser extensions extend the functionality of the browser and the websites being viewed in it. For example, browser extensions can extend the functionality of the browser by adding a new button to the address bar, such as an ever-present currency converter. Buttons like this can also apply to the current website being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, and extension may be installed to embed a "mail this" button next to every link in every page. Compared to web applications, extensions cut across websites and web applications. Extensions are usually in effect across all websites (though some are site-specific). Web applications do not combine with other apps in this way. Rather, web applications run standalone, like any regular website. Packaged web applications and installable web applications are also different from browser extensions because they present very different user interfaces.

"Packaged web applications", in contrast to browser extensions, may look and feel like regular web applications, with a big-screen design and rich user interface. Both extensions and packaged web applications may bundle all their files into a single file that a user downloads and installs. This bundling means that, unlike ordinary web applications, extensions and packaged web applications do not need to depend on content from the web. Browser extensions, packaged web applications, and installable web applications may be distributed via a trusted web store, or via individual websites.

FIG. 1 is a block diagram illustrating a web browser 100 that implements inter-extension messaging using the browser as an intermediary, in accordance with an example implementation. The browser 100 may be implemented in a computing device, such as the computing devices shown and described with respect to FIG. 6 below. As shown in FIG. 1, the browser 100 may be used to implement a first extension process, Extension_A 110, and a second extension process, Extension_B 120. In the browser 100, the Extension_A 110 and the Extension_B 120 are implemented such that they are functionally isolated from each other, so as to reduce the risks associated with running extensions in an open execution environment. In this example, each of the extension processes 110 and 120 may communicate with each other via a request processor 130 of the browser 100. Extension processes 110 and 120 may communicate with each other without knowing about each other, for example without knowing any unique identifier associated each extension.

Using the request processor 130, the Extension_A 110 and the Extension_B 120 may implement a messaging protocol that allows them operate in concert with each other, while retaining their functional isolation and without requiring identification of or knowledge of each other. Request processor 130 may operate as one or more public messaging application programming interface(s) (API) that is configured to mediate messages between extensions. The APIs may be synchronous, or they may be asynchronous such that they return immediately without waiting for the operation to finish. While only two extension processes 110 and 120 and one request processor 130 are shown and described in FIG. 1, it will be appreciated that additional extensions or request processors may be implemented in the browser 100, and the techniques described herein would apply equally to those additional extensions or request processors.

Figure 2:
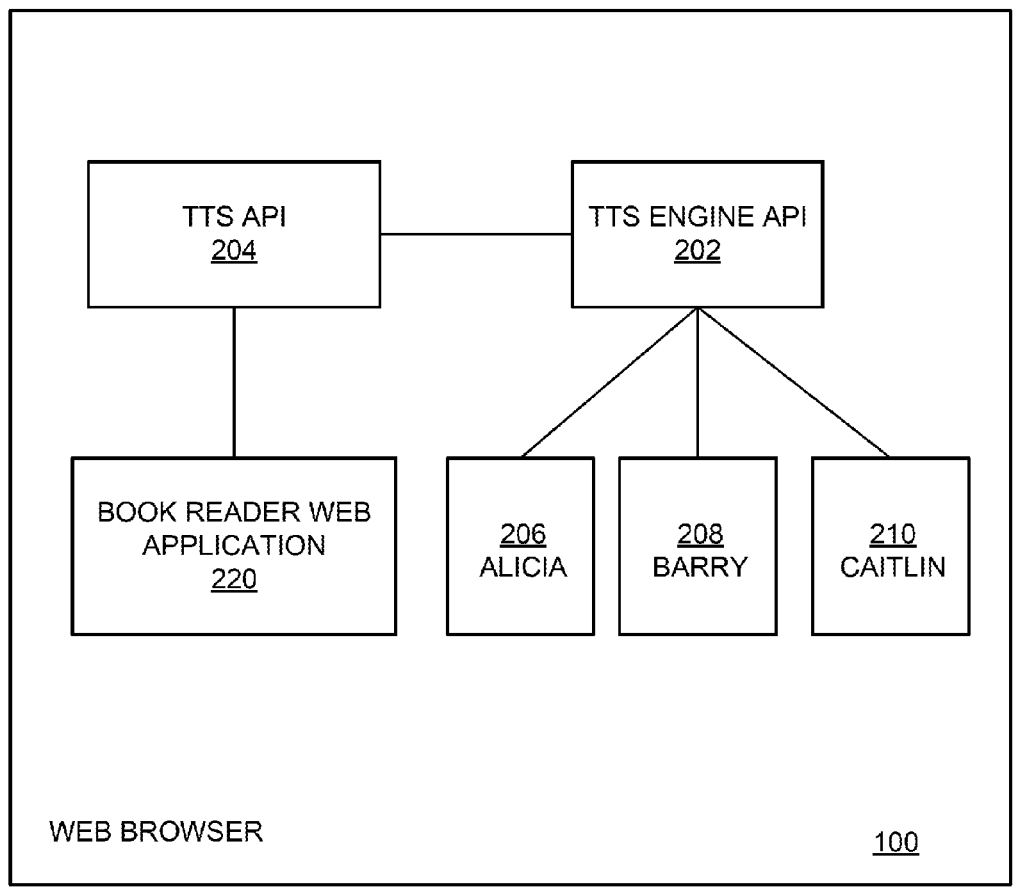
FIG. 2 is a block diagram illustrating an exemplary inter-extension messaging architecture in accordance with an example implementation.

FIG. 2 is a block diagram illustrating an exemplary inter-extension messaging architecture in accordance with an example implementation. The example implementation shown and discussed with respect to FIG. 2 is for illustrative purposes only, and is not meant to limit the described methods and systems. Although the example implementation utilizes a web application to read a book out loud, one skilled in the art will understand that the described systems and methods may apply to any type of web application or browser extension, for example as described above with respect to FIG. 1. As such, the disclosed systems and methods are not limited simply to the book reader or speech provider web applications and browser extensions that are described with respect to FIG. 2. As other examples, the described systems and methods may be implemented using web applications or browser extensions related to games, videos, weather, finance, productivity, social, business, entertainment, news, computer programming, or any other web application, browser extension, or combination thereof. Any type and number of web application(s) and/or browser extension(s) may be utilized to implement the systems and methods described herein.

As shown in FIG. 2, browser 100 includes a "Book Reader" web application 220, which may represent a web application installed by a user of a computing device that is operating browser 100. Book reader web application 220 may include a capability to speak a book out loud using a text-to-speech (TTS) API 204. In certain implementations, browsers may provide native support for speech, using speech synthesis capabilities provided by the operating system. Alternatively or additionally, a user can install browser extensions that register themselves as alternative speech engines, as described in more detail below.

In the example shown in FIG. 2, browser 100 may also include extensions that implement text-to-speech engines. The TTS ENGINE API 202 allows a browser extension to implement text-to-speech engines. For example, in some implementations, if a browser extension registers using TTS ENGINE API 202, the extension may receive events containing an utterance to be spoken and other parameters when any browser extension or packaged web application uses the TTS API 204 to generate speech. The browser extension may then use any available web technology to synthesize and output the speech, and may send events back to the calling function to report the status. "Events" may be thought of as objects that allow a browser extension (or web application) to be notified when something happens.

In some example implementations, each event may include an event type, a character index of a current speech relative to the utterance, and for error events, an optional error message. The event types may include: 'start': the engine has started speaking the utterance; 'word': a word boundary was reached; 'sentence': a sentence boundary was reached; 'marker': a marker was reached; 'end': the engine has finished speaking the utterance; 'interrupted': this utterance was interrupted by another call to speak( ) or stop( ) and did not finish; 'cancelled': this utterance was queued, but then cancelled by another call to speak( ) or stop( ) and never began to speak at all; and 'error': an engine-specific error occurred and this utterance cannot be spoken.

In the example shown in FIG. 2, the extensions include Alicia 206, Barry 208, and Charlie 210, which are registered with the browser 100 (e.g., by a user who has installed the extensions, for example from a web store). In the example shown in FIG. 2, each extension 206, 208, 210 may produce sounds like a different person's voice, and each one may have different audio quality. As discussed above, an extension, such as extensions 206, 208, and 210, can register itself as a speech engine. By doing so, the extension can intercept some or all calls to functions such as speak( ) and stop( ) and provide an alternate implementation. Extensions may be free to use any available web technology to provide speech in various audio formats, including streaming audio from a server, HTML5 audio, Native Client, or Flash. An extension could even perform different actions with the utterances, e.g., display closed captions in a pop-up window, or send them as log messages to a remote server. Further, an extension can specify any number of voices.

In one implementation, TTS ENGINE API 202 may call a server that renders speech and plays audio over a network. Another implementation generates the speech locally on the computer without involving a server at all. Even when the TTS ENGINE API 202 uses a server, the TTS ENGINE API 202 is not operating on a server—TTS ENGINE API 202 is still operating locally, yet TTS ENGINE API 202 may communicate with a remote server to help with implementation of speech processing.

In one exemplary implementation, initially, a user has installed Book Reader web application 220, Alicia 206, and Barry 208 in the user's browser 100. Although book reader web application 220 is a web application and Alicia 206 and Barry 208 are extensions, the distinction is minor and is used for illustrative purposes only. The example(s) described herein could be implemented with any variety of combinations of web applications and/or extensions. In the example shown in FIG. 2, the user may have installed all three from a trusted web store or digital marketplace. When Alicia 206 and Barry 208 load in the browser 100, Alicia 206 and Barry 208 may register themselves with the browser 100 using the TTS ENGINE API 202, so that browser 100 knows they are speech engines.

Figure 3:
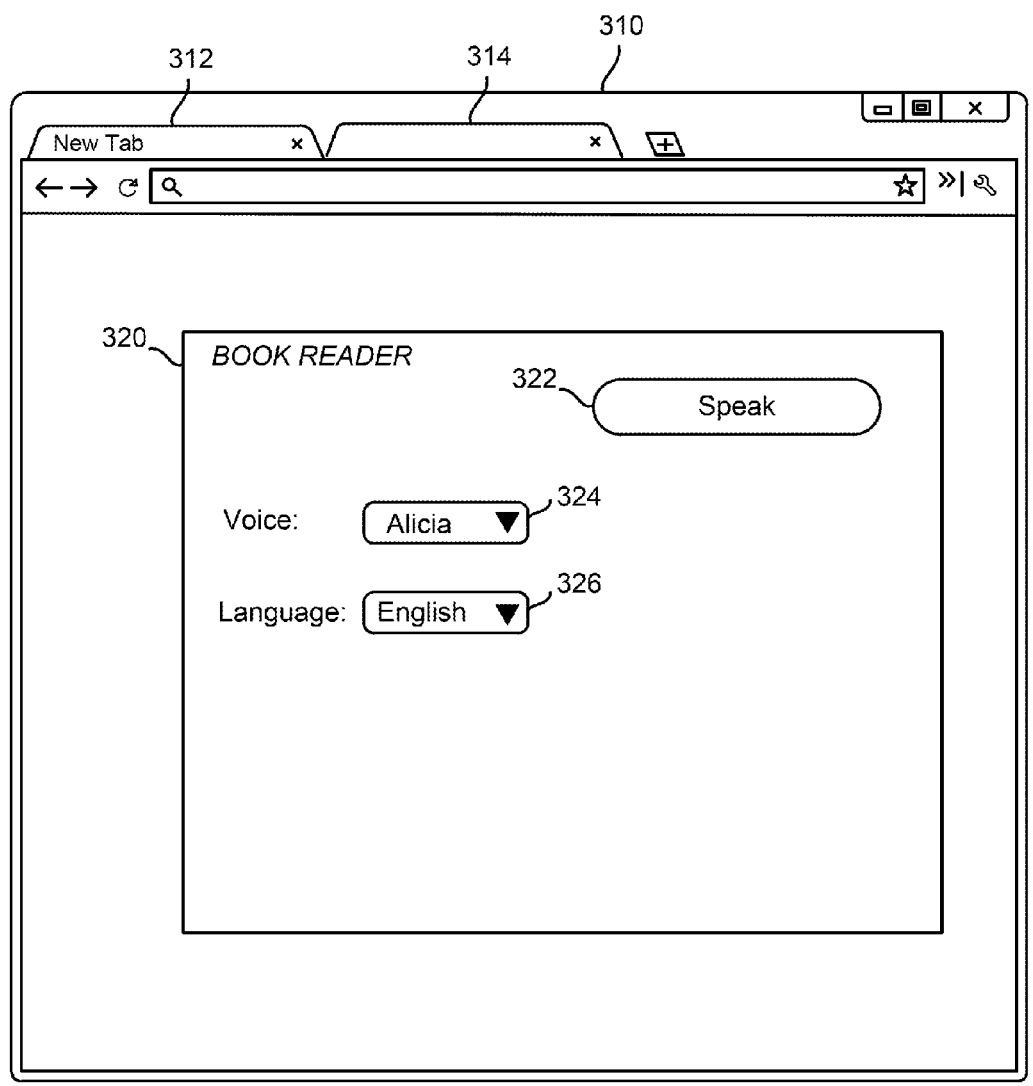
FIG. 3 is an exemplary user interface of a web browser in accordance with the example implementation described with respect to FIG. 2.

FIG. 3 illustrates an exemplary user interface of a web browser in accordance with the example implementation described with respect to FIG. 2. As shown in FIG. 3, a user may view a browser interface 310 including tabs 312 and 314. Each tab in the browser application may use a separate process to protect the overall browser application from bugs and glitches in a rendering engine associated with the browser application. Each tab may execute separate processes that each have read/write access to at least a portion of a memory of the computing device executing the browser application. Access may be restricted from one rendering engine process to other rendering engine processes and to the rest of the system. In this manner, one process running for one web application or for one browser extension may be isolated and separate from other processes running for other web applications or for other browser extensions.

In some implementations, tabs, such as tabs 312 and 314, may execute separate processes, each having its own memory and its own copy of global data structures. Separate processes render separate tabs, which may create separate JavaScript threads as well. One tab (e.g., 312) may be busy while all the other tabs are in use. If there is an error in the renderer of one tab (e.g., tab 312), it may not affect the other tabs or crash the entire browser application.

Book reader web application 220, when launched, may display a graphical user interface 320 that is displayed in tab 312 of browser interface 310. In one implementation, if a user may initially start reading a book using book reader web application 320, but then want to start listening to the book instead of reading. The user may experiment by selecting a graphical user interface element of book reader web application 320 (e.g., pressing a "Speak" 322). Book reader web application 220 may call a function, such as chrome.tts.speak ("It was a dark and stormy night") and the book starts reading out loud. Behind the scenes, the instruction to speak was sent to browser 100. Browser 100 knows that two TTS extensions are registered (i.e., Alicia 206 and Barry 208, shown in FIG. 2), and since no other requirements were given in this example, browser 100 may pick one of them (arbitrarily, or, for example, whichever one was registered first, in this example Alicia 206), and forward the message (e.g., via TTS API 204 and TTS ENGINE API 202) to Alicia 206. Alicia 206 may generate the speech and play the audio, and then send a message back (e.g., to TTS ENGINE API 202) when done. Browser 100 (e.g., via TTS API 204, communicating with TTS ENGINE API 202, as shown in FIG. 2) may forward the "finished" message back to book reader web application 220 so it knows to turn the page and continue on the next page.

In some implementations, a user may select other options from book reader web application 220, for example to experiment with other voices. In those implementations, for example, the user may open the book reader web application 220 interface 320 to modify the web application's settings and choose a voice, for example using a graphical user interface drop down menu 324, shown in FIG. 3. Book reader web application 220 queries the browser 100 and determines that two voices are installed in the browser 100: Alicia 206 and Barry 208. The user chooses Barry this time. Now when the user presses "Speak" 322, book reader web application 220 calls chrome.tts.speak ("The campers were still in shock over seeing the dead body.", {voiceName: "Barry"}), and the browser 100 automatically forwards the speech to Barry 208 this time (for example, using TTS API 204 and TTS ENGINE API 202, as shown in FIG. 2).

In some cases, a web browser extension or web application may experience errors. By having a browser act as an intermediary, the browser may cleanly handle such errors. As an example, Barry 208 crashes when given a sentence too long. Because the browser 100 is the intermediary, if Barry 208 crashes in the middle of a long sentence, the browser 100 (e.g., via TTS ENGINE API 202 and TTS API 204) may send a message back to Book Reader 220 saying that the previous sentence was "interrupted." That way book reader web application 220 knows to try again with the same sentence rather than going on to the next one. Book reader web application 220 may also discover at this point that Barry 208 is no longer available, and book reader web application 220 can choose to either prompt the user for another voice, or choose no voice and let the browser 100 pick another one arbitrarily.

Users may install any number of extensions. In one example, the user may install another extension (Caitlin 210) in the browser 100. The next time book reader web application 220 queries for a list of possible voices, it will now see Caitlin 210 as well, and the user may start using Caitlin 210. When Caitlin 210 registered, that extension only listed "English" as a supported language, but Alicia 206 listed both English and Spanish. The book may encounter a combination of languages within one book, such as a single sentence in Spanish. In such an implementation, then book reader web application 220 requests a Spanish sentence to be spoken, the browser 100 may automatically forward that request to Alicia 206 instead, because Alicia 206 listed both English and Spanish as a supported language. The next sentence is in English again, so that sentence may go back to Caitlin 210's voice.

All of this is possible because browser 100 acts as the intermediary. Book Reader 220 calls chrome.tts.speak (and other chrome.tts methods using TTS API 204), and the extensions 206, 208, 210 all call chrome.ttsEngine methods (using TTS ENGINE API 202), and the browser 100 sends them messages in order to make everything work. The browser 100 provides a mechanism for an extension to send a message to another extension by specifying a unique ID of the extension. By acting as an intermediary, the browser 100 allows communication between web applications and extensions that is more anonymous and private because extensions and web applications do not need to know unnecessary details about each other—for example, they do not need to know unique IDs of other extensions. Additionally, by acting as an intermediary, the browser 100 is less prone to error because the browser 100 can facilitate the communication and disallow improper use of an API, and cleanly handle error cases.

Because the browser acts as an intermediary (e.g., using TTS API 204 and TTS ENGINE API 202), one company may create a web application (such as book reader 220) without having to get together with companies that create extensions (such as voices extensions 206, 208, and 210). Further, the book reader web application 220 does not have to know the unique ID of every possible voice. With the browser 100 acting as an intermediary, the book reader web application 220 does not have to send a message to every possible voice and see which ones respond, and the book reader web application 220 does not have to ask a browser for a list of all extensions installed by a user. By having the browser 100 act as an intermediary between book reader web application 220 and extensions 206, 208, and 210, users do not have to grant permissions to book reader web application 220 to access lists of installed extensions (and thus expose potentially sensitive information to applications). Further, because the browser 100 acts as an intermediary, when a new voice comes along, book reader web application 220 may automatically utilize the new voice if it is installed by a user. In contrast, if the browser 100 did not act as an intermediary, book read web application 220 would not know the new voice existed, which means that a third party could not create a new voice without getting together with all of the talking web applications and convincing them to offer the new voice as a choice.

Because the extensions 206, 208, and 210 and the book reader web application 220 do not need to communicate with each other directly, then if Barry 208 crashes, book reader web application 220 knows to retry the sentence with a different voice. Because the browser 100 is the intermediary, it can present a consistent interface to book reader web application 220, such that every call to tts.speak will eventually either succeed or result in an error. In contrast, if the browser did not act as an intermediary, one of the extensions (e.g., 206, 208, or 210) could crash or hang and the web application (e.g., book reader web application 220) might not know what the problem is.

Similarly, with the browser 100 acting as an intermediary, book reader web application 220 does not have to deal with extension bugs, and every voice extension does not have to deal with bugs in talking applications (such as book reader web application 220). In some implementations, when the browser 100 is used as an intermediary, it may perform error checking automatically on both sides. For example, the browser 100 may prevent book reader web application 220 from sending too much data at once, and TTS Engine API 202 may not be allowed to send notifications about utterances that are no longer active. The user interface shown in FIG. 3 is merely for illustrative purposes. Any type of user interface(s) may be used without departing from the scope of the methods and systems described herein.

Figure 4:
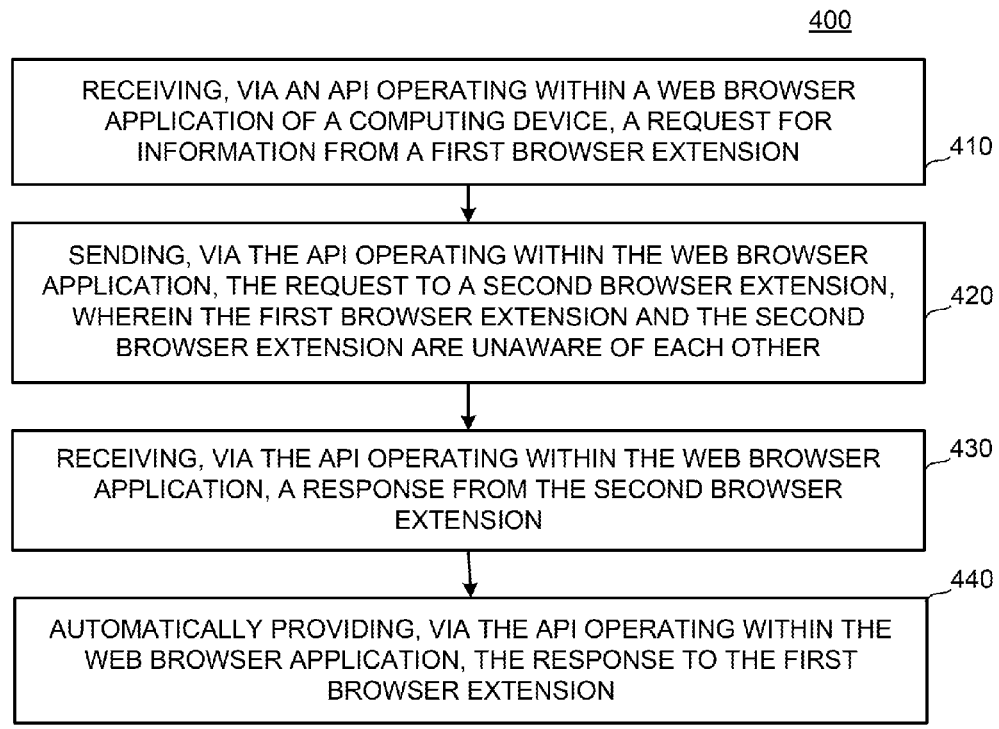
FIG. 4 is a flowchart illustrating a method for extension messaging using the browser as an intermediary.

FIG. 4 is a flowchart illustrating a method 400 for extension messaging using the browser as an intermediary, in accordance with an example implementation. The method 400 may be implemented using the browser 100 shown in FIGS. 1 and 2. It will be appreciated, however, that other configurations and techniques may be used to implement the method 400.

The method 400 includes, at block 410, receiving, via an API operating within a web browser application of a computing device (e.g., request processor 130 or TTS API 204 of the web browser 100, as shown in FIGS. 1 and 2), a request for information from a first browser extension (e.g., the extension process Extension_A 110). The method 400 further includes, at block 420 sending, within the web browser 100, the request to a second browser extension (e.g., Extension_B 120). The first browser extension and the second browser extension are unaware of each other. In some implementations, extensions are each packaged as an installable bundle of files including a manifest file and at least one HTML file.

At block 430, the method 400 includes receiving, via the API operating within the web browser application, a response from the second browser extension. At block 440, the method 400 includes automatically providing, via the API operating within the web browser application, the response to the first browser extension (e.g., via request processor 130).

In such a way, a web application may can send a request to a browser extension via an API. If the extension responds to the request via the API, the response may be sent back to the web application. However, if the web application sends a malformed request, the browser (e.g., the API) can handle the error and send an error response to the web application, so the browser extension does not need to see a malformed request. Similarly, if the browser extension sends a malformed response, fails to respond to the request within a predetermined time, or crashes, the browser can send an error response to the web application, such that the web application does not need to see a malformed response.

Because the browser acts as the intermediary, clients of the APIs (in this example, the web application and the browser extension) do not need to handle the details of communication (including communication failure). The web application and the browser extension may just use the API, and the browser may handle the communication details, including error handling.

Figure 5:
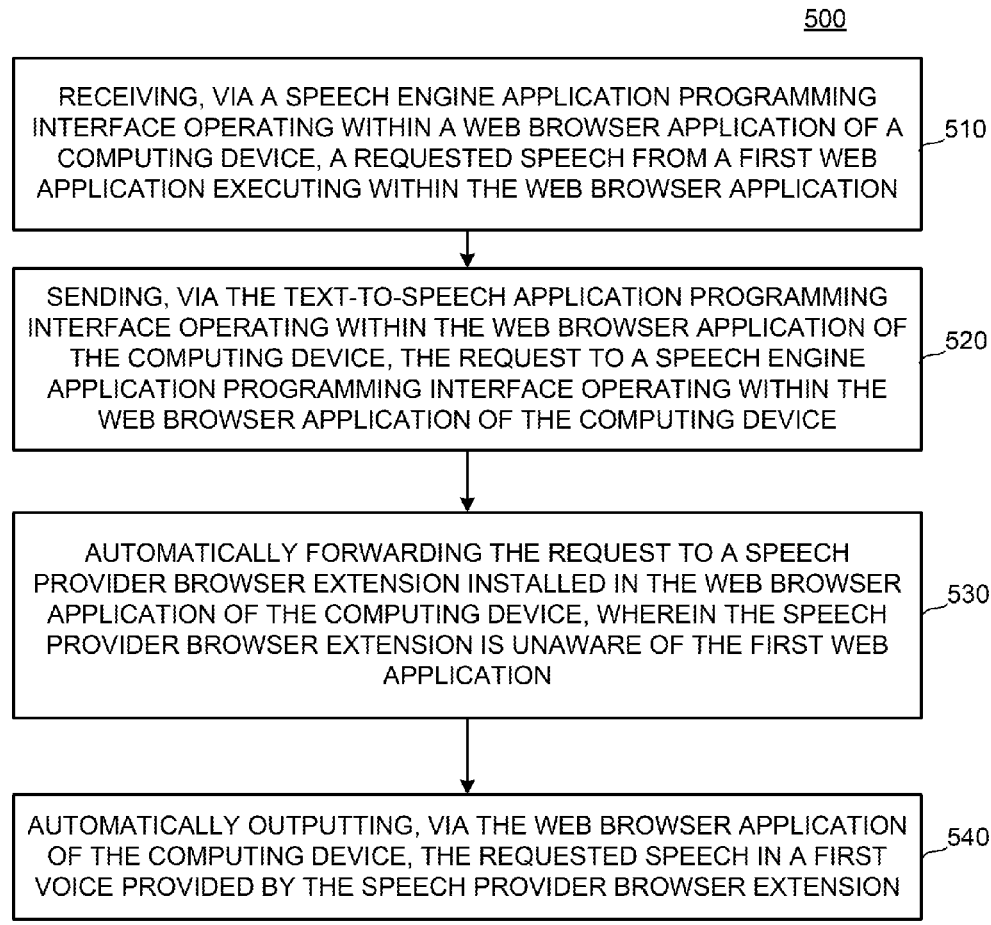
FIG. 5 is a flowchart illustrating a method for extension messaging using the browser as an intermediary, in accordance with an example implementation described above with respect to FIGS. 2 and 3.

FIG. 5 is a flowchart illustrating a method for extension messaging using the browser as an intermediary, in accordance with an example implementation described above with respect to FIGS. 2 and 3. The method 500 may be implemented using the browser 100 shown in FIG. 2. It will be appreciated, however, that other configurations and techniques may be used to implement the method 500, and that method 500 is exemplary only and does not limit the described systems and methods to the use of a particular type of API, web application, or browser extension.

The method 500 includes, at block 510, receiving, via a text-to-speech API operating within a web browser application of a computing device (e.g., TTS API 204 as shown in FIG. 2), a requested speech from a first web application (e.g., book reader web application 202) executing within the web browser application. The method 500 further includes, at block 520 sending, via the text-to-speech API operating within the web browser application of the computing device, the request to a speech engine API operating within the web browser application of the computing device (e.g., TTS ENGINE API 202). The method 500 further includes, at block 530, automatically forwarding the request to a speech provider browser extension (e.g., extension 206, 208, 210) installed in the web browser application of the computing device. The speech provider browser extension is unaware of the first web application (e.g., extension 206 is unaware of book reader web application 220).

At block 540, the method 500 includes automatically outputting, via the web browser application of the computing device, the requested speech in a first voice provided by the speech provider browser extension (e.g., in Alicia's voice from Alicia 206). The voice may be output using book reader web application 220, for example.

Figure 6:
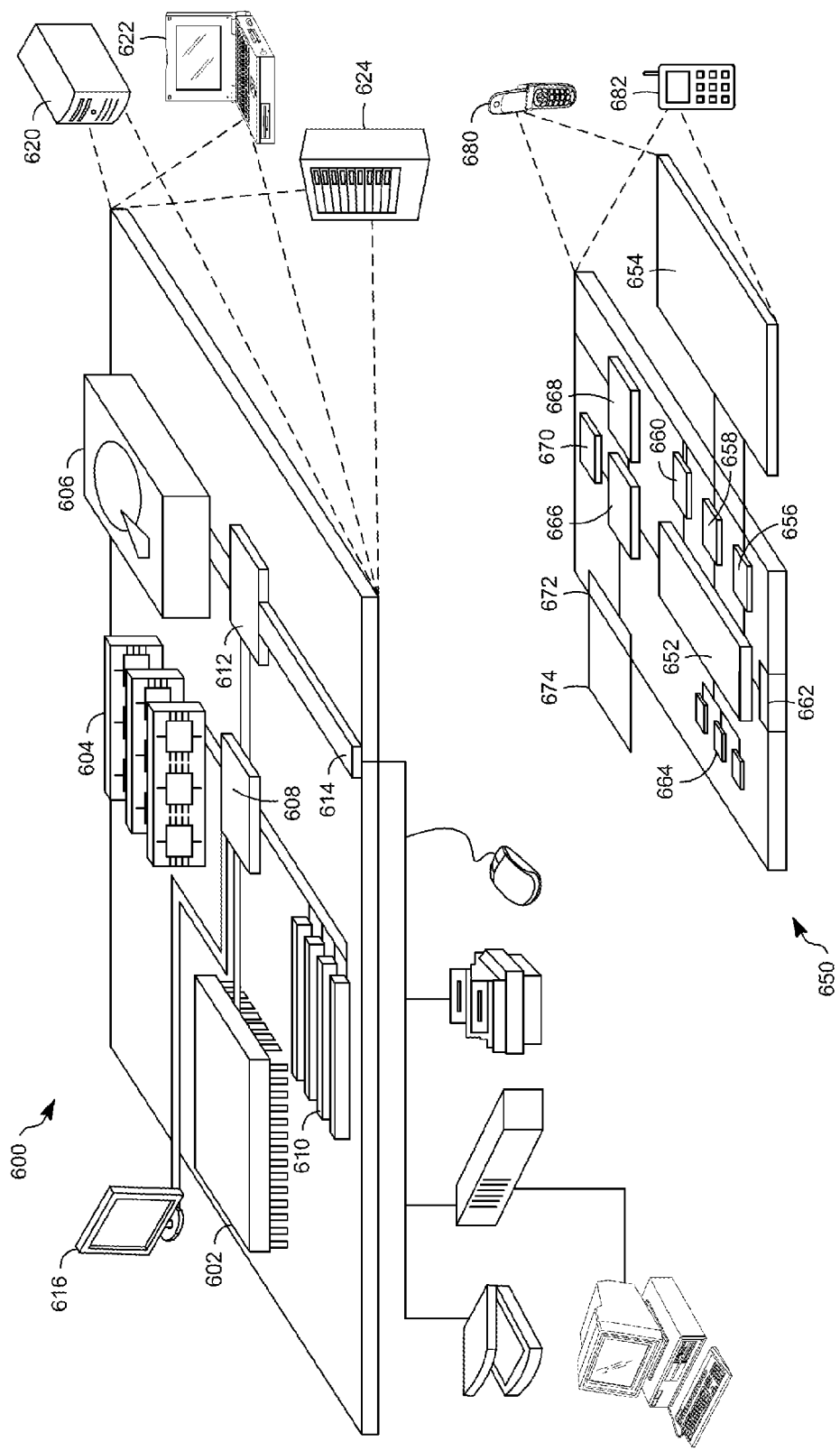
FIG. 6 is a diagram illustrating a computing device and a mobile computing device that can be used to implement the techniques described herein in accordance with an example embodiment.

FIG. 6 is a diagram that shows an example of a generic computer device 600 and a generic mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, which may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
    mediating cross-extension communications between a first browser extension and a second browser extension installed in a web browser running on a computing device, the first browser extension and the second browser extension each providing respective additional functionalities to the web browser, the first browser extension being functionally isolated from the second browser extension, and being unaware of the second browser extension and the additional functionalities being provided by the second browser extension to the web browser,
    wherein mediating the cross-extension communications includes:
    receiving a request for a web browser functionality from the first browser extension, at a messaging application programming interface in the web browser, the request not identifying the second extension;
    determining, by the messaging application programming interface, whether the requested web browser functionality included in the request from the first browser extension is an additional functionality provided to the web browser by the second extension; and
    forwarding the request received from the first browser extension, by the messaging application programming interface, to the second browser extension, when the requested web browser functionality is an additional functionality provided to the web browser by the second browser extension;
    intercepting, by the messaging application programming interface, an error from the second browser extension;
    sending an error message to the first browser extension, by the messaging application programming interface, when the requested web browser functionality is not available, and
    automatically forwarding the request received from the first browser extension, by the messaging application programming interface, to a third browser extension installed in the web browser of the computing device; and
    automatically outputting, via the web browser of the computing device, an output provided by the third browser extension.

2. The method of claim 1, wherein the first browser extension and the second browser extension are each separately packaged as an installable bundle of files including a manifest file and at least one HTML file.

3. The method of claim 1, wherein a unique identifier associated with the second browser extension is unknown to the first browser extension, and the first browser extension communicates with the selected browser extension only via the messaging application programming interface in the web browser.

4. The method of claim 1, further comprising:
    selecting, by the messaging application programming interface, the second browser extension from a plurality of browser extensions installed in the web browser.

5. The method of claim 4, wherein the selecting includes determining that the second browser extension includes a supported feature requested by the first browser extension.

6. The method of claim 1, wherein the first browser extension and the second browser extension are both associated with an account of the user.

7. A non-transitory computer readable storage medium having recorded and stored thereon instructions that, when executed by a computing device, cause the computing device to mediate cross-extension communications between a first browser extension and a second browser extension installed in a web browser running on the computing device, the first browser extension and the second browser extension each providing respective additional functionalities to the web browser, the first browser extension being separate and functionally isolated from the second browser extension, and being unaware of the second browser extension and the additional functionalities being provided by the second browser extension to the web browser, wherein mediating the cross-extension communications comprises:
    wherein causing the computing device to mediate communications includes:
    receiving a request for a web browser functionality from the first browser extension, at a messaging application programming interface in the web browser, the request not identifying the second extension;
    determining, by the messaging application programming interface, whether the requested web browser functionality included in the request from the first browser extension is an additional functionality provided to the web browser by the second extension; and
    forwarding the request received from the first browser extension, by the messaging application programming interface, to the second browser extension, when the requested web browser functionality is an additional functionality provided to the web browser by the second browser extension;

intercepting, by the messaging application programming interface, an error from the second browser extension;

sending an error message to the first browser extension, by the messaging application programming interface, when the requested web browser functionality is not available and automatically forwarding the request received from the first browser extension, by the messaging application programming interface, to a third browser extension installed in the web browser of the computing device; and automatically outputting, via the web browser of the computing device, an output provided by the third browser extension.

8. The non-transitory computer readable storage medium of claim 7, wherein the first browser extension and the second browser extension are each separately packaged as an installable bundle of files including a manifest file and at least one HTML file.

9. The non-transitory computer readable storage medium of claim 7, wherein a unique identifier associated with the second browser extension is unknown to the first browser extension, and the first browser extension communicates with the selected browser extension only via the messaging application programming interface in the web browser.

10. The non-transitory computer readable storage medium of claim 7, wherein meditating the cross-extension communications further includes:

selecting, by the messaging application programming interface, the second browser extension from a plurality of browser extensions installed in the web browser.

11. The non-transitory computer readable storage medium of claim 10, wherein the selecting includes determining that the second browser extension includes a supported feature requested by the first browser extension.

12. The non-transitory computer readable storage medium of claim 7, wherein the first browser extension and the second browser extension are both associated with an account of the user.

13. The non-transitory computer readable storage medium of claim 7, wherein the request for the web browser functionality from the first browser extension includes a request for a speech functionality.

14. An apparatus comprising:

a memory; and a processor operably coupled to the memory and configured to execute code to mediate cross-extension communications between a first browser extension and a second browser extension installed in a web browser of the apparatus, the first browser extension and the second browser extension each providing respective additional functionalities to the web browser, the first browser extension being separate and functionally isolated from the second browser extension, and being unaware of the second browser extension and the additional functionalities being provided by the second browser extension to the web browser, wherein meditating the cross-extension communications includes:

receiving a request for a web browser functionality from the first browser extension, at a messaging application programming interface in the web browser, the request not identifying the second extension;

determining, by the messaging application programming interface, whether the requested web browser functionality included in the request from the first browser extension is an additional functionality provided to the web browser by the second extension; and forwarding the request received from the first browser extension, by the messaging application programming interface, to the second browser extension, when the requested web browser functionality is an additional functionality provided to the web browser by the second browser extension; and intercepting, by the messaging application programming interface, an error from the second browser extension;

sending an error message to the first browser extension, by the messaging application programming interface, when the requested web browser functionality is not available and automatically forwarding the request received from the first browser extension, by the messaging application programming interface, to a third browser extension installed in the web browser of the computing device; and automatically outputting, via the web browser of the computing device, an output provided by the third browser extension.

15. The apparatus of claim 14, wherein the first browser extension and the second browser extension are each separately packaged as an installable bundle of files including a manifest file and at least one HTML file.

16. The apparatus of claim 14, wherein a unique identifier associated with the second browser extension is unknown to the first browser extension, and the first browser extension communicates with the selected browser extension only via the messaging application programming interface in the web browser.

17. The apparatus of claim 14, wherein meditating the cross-extension communications further includes:

selecting, by the messaging application programming interface, the second browser extension from a plurality of browser extensions installed in the web browser.

18. The apparatus of claim 17, wherein the selecting includes determining that the second browser extension includes a supported feature requested by the first browser extension.

19. The apparatus of claim 14, wherein the first browser extension and the second browser extension are both associated with an account of the user.

20. The apparatus of claim 14, wherein the request for the web browser functionality from the first browser extension includes a request for a speech functionality.

* * * * *